(12) United States Patent
Das et al.

(10) Patent No.: US 11,421,057 B2
(45) Date of Patent: Aug. 23, 2022

(54) COMBINED SEQUENTIAL PARALLEL REACTOR CONFIGURATION

(71) Applicant: BOREALIS AG, Vienna (AT)

(72) Inventors: Shital Das, Helsinki (FI); Kauno Alastalo, Porvoo (FI)

(73) Assignee: BOREALIS AG, Vienna (AT)

( * ) Notice: Subject to any disclaimer, the term of this patent is extended or adjusted under 35 U.S.C. 154(b) by 295 days.

(21) Appl. No.: 16/640,404

(22) PCT Filed: Oct. 23, 2018

(86) PCT No.: PCT/EP2018/079043
§ 371 (c)(1),
(2) Date: Feb. 20, 2020

(87) PCT Pub. No.: WO2019/086300
PCT Pub. Date: May 9, 2019

(65) Prior Publication Data
US 2020/0362074 A1 Nov. 19, 2020

(30) Foreign Application Priority Data
Nov. 6, 2017 (EP) .................................... 17200142

(51) Int. Cl.
*C08F 210/16* (2006.01)
*C08F 2/34* (2006.01)
*B01J 19/24* (2006.01)

(52) U.S. Cl.
CPC ............ *C08F 210/16* (2013.01); *B01J 19/245* (2013.01); *B01J 19/2445* (2013.01); *B01J 19/2455* (2013.01); *B01J 2219/0004* (2013.01); *B01J 2219/00038* (2013.01)

(58) Field of Classification Search
USPC ............................... 525/53; 422/134; 526/65
See application file for complete search history.

(56) References Cited

U.S. PATENT DOCUMENTS

| | | | | |
|---|---|---|---|---|
| 4,751,265 | A * | 6/1988 | Asanuma | C08F 297/083 525/323 |
| 2009/0163642 | A1 | 6/2009 | Kiss et al. | |
| 2013/0178586 | A1 * | 7/2013 | Kock | C08L 23/12 525/240 |

FOREIGN PATENT DOCUMENTS

WO WO 9802471 1/1998

OTHER PUBLICATIONS

International Search Report and Written Opinion for corresponding patent application No. PCT/EP2018/079043 dated Jan. 21, 2019.

\* cited by examiner

*Primary Examiner* — Fred M Teskin
(74) *Attorney, Agent, or Firm* — Fay Sharpe LLP

(57) ABSTRACT

The present invention relates to multi reactor configurations for producing polypropylene copolymers and to processes for producing polypropylene copolymers. The reactor configuration for the production of propylene copolymers comprises at least three reactors R1, R1 and R3, all reactors having inlet and outlet, whereby reactors R2 and R3 are configured in parallel both downstream of reactor R1; and whereby reactor R1 is configured in series and upstream of reactors R2 and R3, and whereby the outlet of reactor R1 is coupled with the inlets of both reactors R2 and R3.

15 Claims, 3 Drawing Sheets

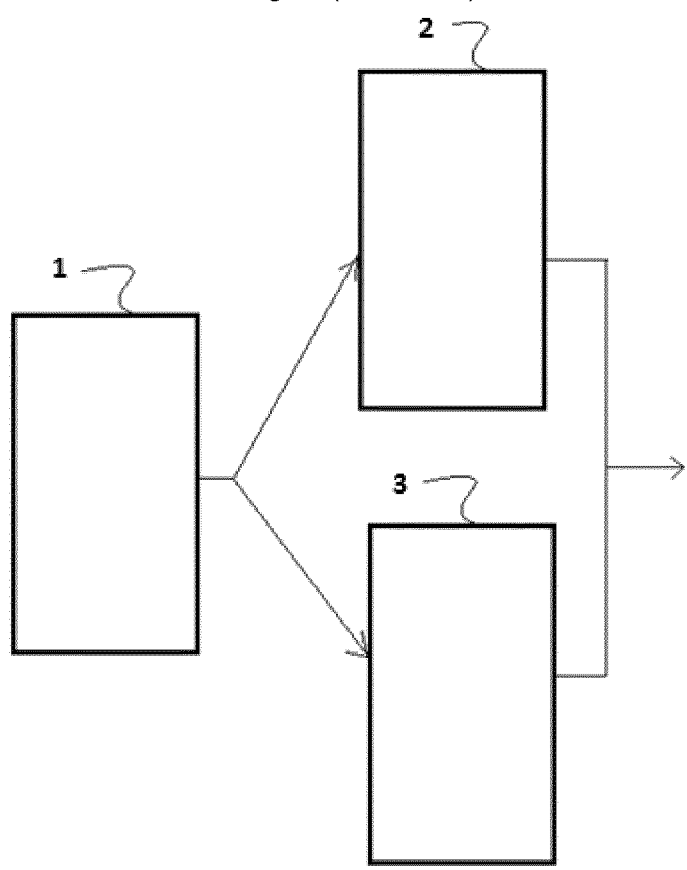

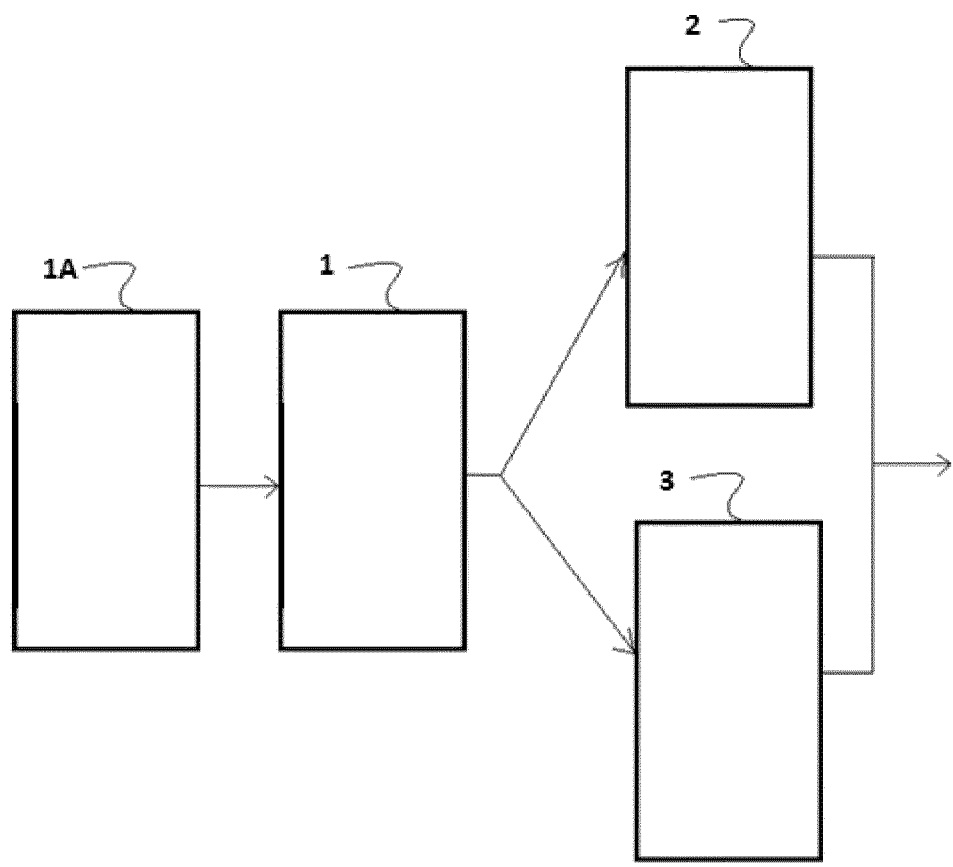
Fig 4 (invention)

COMBINED SEQUENTIAL PARALLEL REACTOR CONFIGURATION

CROSS-REFERENCE TO RELATED APPLICATIONS

This application is a 371 of PCT Patent Application No. PCT/EP2018/079043, filed on Oct. 23, 2018, which claims the benefit of European Patent Application No. 17200142.2, filed on Nov. 6, 2017, the subject matter of each of which is hereby incorporated herein by reference in its entirety.

BACKGROUND

The present invention relates to multi reactor configurations for producing polypropylene copolymers and to processes for producing polypropylene copolymers.

Heterophasic propylene copolymers also denoted impact propylene copolymers are well known in the art. Heterophasic propylene copolymers are composed of two phases, i.e. a highly crystalline matrix phase and an amorphous elastomer phase dispersed therein. These two phases are either mixed by in-situ blending via reactors coupled in series or by mechanical blending of two components produced separately, whereby in-situ blending is generally preferred due to the better mixing quality. In addition to that it was recognized in the art that further improved properties can be obtained by using a bimodal or trimodal matrix phase and/or a bimodal elastomer phase. When combined with desirable in-situ blending there is the need for multi reactors coupled in series. As a further separate option the use of solution polymerization with two or more reactor trains configured in parallel has been described. However, the separation, i.e. workup of the solvent and catalyst in solution polymerization introduces undesirable complexity. WO01/77224 describes at least two polymerization reactors configured in parallel and blending of the polymer products. In a specific embodiment there is provided a loop 1-loop 2-gas phase reactor 1 and parallel thereto a gas phase reactor 2, whereby gas phase reactor 2 is operated for the production of elastomer independently, i.e. by feeding catalyst and monomers separately. In other words, the outlet of reactor 2 or the separator directly downstream thereof is not coupled with reactor 4.

WO2014/094990 discloses a process for the production of a heterophasic polypropylene whereby a quadruple stage sequential reactor configuration loop-gas phase reactor 1-gas phase reactor 2-gas phase reactor 3 is applied, wherein the elastomer phase is produced in gas phase reactors 2 and 3. The amount of elastomer phase as produced in gas phase reactors 2 and 3 is rather limited such as 11 to 22 wt.-%.

WO2013/041507 discloses a process for the production of a heterophasic polypropylene whereby a triple stage sequential reactor configuration loop-gas phase reactor 1-gas phase reactor 2 is used for the production of the matrix phase with the elastomer phase being incorporated by mechanical blending. Due to mechanical blending higher amounts of higher than 20 wt.-% can be achieved. EP2586823 discloses a process for the production of a heterophasic polypropylene whereby a quadruple stage sequential reactor configuration loop-gas phase reactor 1-gas phase reactor 2-gas phase reactor 3 is applied with the matrix phase being produced in the first three reactors, i.e. loop-gas phase reactor 1-gas phase reactor 2 and the elastomer phase being produced in gas phase reactor 3. Again the amount of elastomer as prepared in the final reactor is rather limited which is partially compensated by mechanical blending of small amounts of impact modifiers.

EP2174980 discloses a process for the production of a heterophasic polypropylene whereby a triple stage sequential reactor configuration loop-gas phase reactor 1-gas phase reactor 2 is used with the matrix phase being produced in the loop reactor only and the elastomer phase being produced in gas phase reactors 1 and 2. However, such sequence does not provide bimodality in the matrix.

WO2011/076354 similarly is concerned with a process for the production of a heterophasic polypropylene whereby a quadruple stage sequential reactor configuration loop-gas phase reactor 1-gas phase reactor 2-gas phase reactor 3 is applied, wherein the elastomer phase is produced in gas phase reactors 2 and 3.

Triple or quadruple stage sequential reactor configurations nevertheless have certain limitations. In a first aspect a pressure decrease enabling easy transfer of the polymer intermediate powder from one reactor to the following reactor would be desirable. In a second and a more important aspect, the catalyst productivity declines over the reactors coupled in series. Addition of a second catalyst into one or more reactors following the first reactor is thinkable but usually leads to high complexity due to need for deactivation of the catalyst used in the preceding reactor. Further introduction of catalyst at the final reactor usually will increase the risk of catalyst flushing. In a third and also important aspect, the powder obtained as for example from three preceding reactors displaces undesirably high volume in the fourth reactor. In a forth and also important aspect, the dissimilarity of the individual fractions as produced in the individual reactors is somewhat limited. For example the hydrogen feed for modifying the melt flow rate and dependent thereon the molecular weight results in certain limitations and/or additional measures to be taken such as degassing steps.

The disadvantages of existing quadruple stage sequential reactor configurations lead to certain constraints in the polymerization process and insofar also in the polymer products which can be obtained.

There is insofar still the need for an economical reactor configuration enabling high flexibility as regards polymerization conditions and insofar enabling high flexibility as regards polymer design.

SUMMARY OF THE INVENTION

The present invention insofar provides a reactor configuration for the production of propylene copolymers comprising at least three reactors R1, R2 and R3, all reactors having inlet and outlet, whereby reactors R2 and R3 are configured in parallel both downstream of reactor R1; and whereby reactor R1 is configured in series and upstream of reactors R2 and R3, and whereby the outlet of reactor R1 is coupled with the inlets of both reactors R2 and R3.

In addition to that the present invention is concerned with a reactor configuration for the production of propylene copolymers further comprising reactor R1A, whereby reactor R1A is configured in series and upstream of reactor R1.

In a further aspect, the present invention provides a process for the polymerization of propylene copolymers in a reactor configuration including at least three reactors R1, R2 and R3, all reactors having inlet and outlet, whereby reactors R2 and R3 are configured in parallel both downstream of reactor R1; and whereby reactor R1 is configured in series and upstream of reactors R2 and R3; and whereby the outlet of reactor R1 is coupled with the inlets of both reactors R2 and R3.

the process comprising (a) polymerizing propylene and optionally at least one ethylene and/or C4 to C12 α-olefin in reactor R1 thereby obtaining a polypropylene fraction (PP2), (b) withdrawing polypropylene fraction (PP2) from reactor R1

(c) splitting said withdrawn polypropylene fraction (PP2) into two streams (S1) and (S2) and transferring stream (S1) into reactor R2 and stream (S2) into reactor R3

(d) polymerizing propylene and optionally at least one ethylene and/or C4 to C12 α-olefin in reactor R2 obtaining a polypropylene fraction (PP3), and independently therefrom polymerizing propylene and optionally at least one ethylene and/or C4 to C12 α-olefin in reactor R3 obtaining a polypropylene fraction (PP4)

(e) combining polypropylene fraction (PP3) and polypropylene fraction (PP4) to yield the final propylene (co) polymer.

In yet a further aspect the present invention provides a process for the polymerization of propylene copolymers in a reactor configuration including at least four reactors R1A, R1, R2 and R3, all reactors having inlet and outlet, whereby reactor R1 is configured in series and downstream of reactor R1A, and whereby reactors R2 and R3 are configured in parallel both downstream of reactor R1; and whereby the outlet of reactor R1 is coupled with the inlets of both reactors R2 and R3; and whereby reactor R1 is configured in series and upstream of reactors R2 and R3, the process comprising (a) polymerizing propylene and optionally at least one ethylene and/or C4 to C12 α-olefin in reactor R1A obtaining a polypropylene fraction (PP1), transferring polypropylene fraction (PP1) to reactor R1

(b) further polymerizing polypropylene fraction (PP1) by feeding propylene and optionally at least one ethylene and/or C4 to C12 α-olefin in reactor R1 thereby obtaining a polypropylene fraction (PP2), (c) withdrawing polypropylene fraction (PP2) from reactor R1

(d) splitting said withdrawn polypropylene fraction (PP2) into two streams (S1) and (S2) and transferring stream (S1) into reactor R2 and stream (S2) into reactor R3;

(e) further polymerizing in reactor R2 by feeding propylene and optionally at least one ethylene and/or C4 to C12 α-olefin obtaining a polypropylene fraction (PP3), and independently therefrom polymerizing propylene and optionally at least one ethylene and/or C4 to C12 α-olefin in reactor R3 obtaining a polypropylene fraction (PP4)

(f) combining polypropylene fraction (PP3) and polypropylene fraction (PP4) to yield the final propylene (co) polymer.

In yet a further aspect, the present invention provides use of a reactor configuration as described herein in the following for increase of throughput and/or productivity versus a sequential reactor setup R1-R2-R3 or R1A-R1-R2-R3.

BRIEF DESCRIPTION OF THE FIGURES

In the following the invention shall be described in more detail also with reference to the Figures.

FIG. 3 depicts a reactor configuration according to the present invention having three reactors.

FIG. 4 depicts a reactor configuration according to the present invention having four reactors.

DETAILED DESCRIPTION

Figure 1:
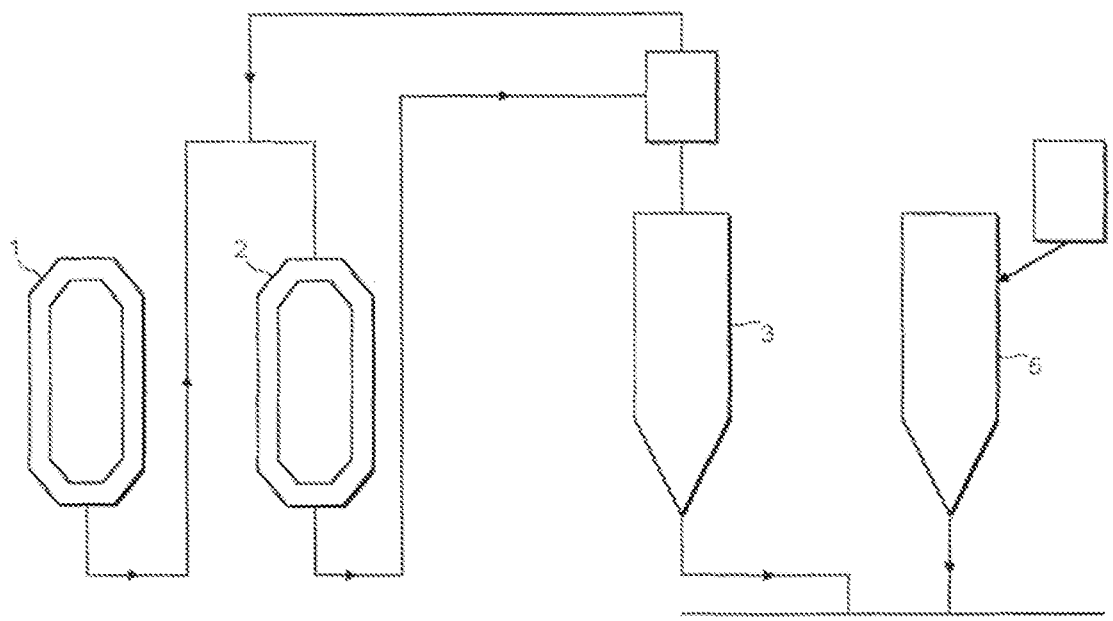
FIG. 1 depicts a reactor configuration of the prior art, whereby reactors 1, 2 and 3 are configured in series with a further reactor 5 being operated independently therefrom.

"Configured in parallel" means for a two reactor configuration that the reaction product of the first reactor is directly combined with the reaction product of the second reactor. Directly combined insofar means the intimate mixing of the neat polymer powder as obtained directly from the reactors without any downstream treatment. It is self explaining configuration in parallel may hold for 2, 3, 4 or more reactors. However, usually only two reactors are configured in this way.

"Configured in series" stands opposite to "Configured in parallel" and means for a two reactor configuration that the reaction product of the first reactor is transferred for further reaction to the second reactor. It is self explaining configuration in series may hold for 2, 3, 4 or more reactors.

Sequential reactor configuration is equivalent to "configured in series". Upstream refers to the process direction starting with the monomers and ending with the final polymer. In the same way downstream is to be understood. For example the outlet of a reactor is downstream to the inlet.

"Outlet coupled with the inlets of both reactors" means that a reactor outlet of a first reactor is coupled with the inlets of two further reactors. The outlet insofar has to split into two inlet lines, a first line connected with one of the further reactors and a second line connected with the second of the further reactors. As a matter of definition there is the need for splitting the outlet of the upstream reactor.

"Component forming essentially the matrix phase" means the reaction product obtained forms the matrix phase. The term "essentially" indicates there is no way of tracing back exactly the production history. Usually the heterophasic composition is subjected to a xylene solubles test yielding a xylene insoluble fraction (XCU) and a xylene soluble fraction (XCS). Generally the xylene insoluble fraction (XCU) corresponds essentially to the matrix phase, whereas generally the xylene soluble fraction (XCS) corresponds essentially to the elastomer phase. "Component forming essentially the elastomer phase" means the reaction product obtained forms the elastomer phase. The term "essentially" indicates there is no way of tracing back exactly the production history.

Throughput is the rate of production in tons per hour.

Productivity is the ratio of rate of production in tons per hour divided by the total reactor volume in cubic meter.

Reactor configuration for the production of propylene (co)polymers according to the present invention comprising at least three reactors R1, R2 and R3, all reactors having inlet and outlet is characterized by two main aspect. First, reactor R2 and R3 are configured in parallel both downstream of reactor R1. This means the reactors R2 and R3 are not configured in series. Further reactor R1 is coupled with the inlets of both reactors R2 and R3. This necessarily involves splitting of the reaction product as obtained from reactor R1 into two streams. A skilled person will understand that practically a control valve or further means for controlling and also modifying the split into to the two streams will be installed. As defined above, the configuration of R2 and R3 in parallel means that the reaction product of R2 is directly combined with the reaction product R3. Directly combined insofar means the intimate mixing of the neat polymer powder as obtained directly from reactors R2 and R3 without any downstream treatment.

For achieving the direct combination of the reaction product of reactor R2 with the reaction product of reactor R3, the outlet from reactor R2 and the outlet from reactor R3 are directly coupled and joined by appropriate pipe and fitting design so as to enable the intimate mixing of the joined streams exiting from both reactor R2 and reactor R3. Typically, each reactor R2 and R3 discharges the power either intermittently or continuously, preferably continuously, to a powder receiver vessel. The reactors R2 and R3 may each have a dedicated powder receiver vessel where they discharge the powder, or alternatively they may discharge to a common powder receiver vessel.

A powder stream may then be withdrawn from the powder receiver vessel(s) either intermittently or continuously, preferably continuously. The powder stream may then be suitably passed to a powder mixer or a powder bin where the powder is maintained and optionally mixed before it is extruded to pellets. If each of the reactors R2 and R3 has a dedicated powder receiver vessel, then the powder streams may be combined, for instance, by joining the transfer pipes in a suitable way, such as an Y-junction or a T-junction. The combined stream may then be passed to the powder bin or powder mixer. Alternatively, the powder stream from each powder receiver vessel may be passed to the powder bin or powder mixer as separate streams.

Figure 2:
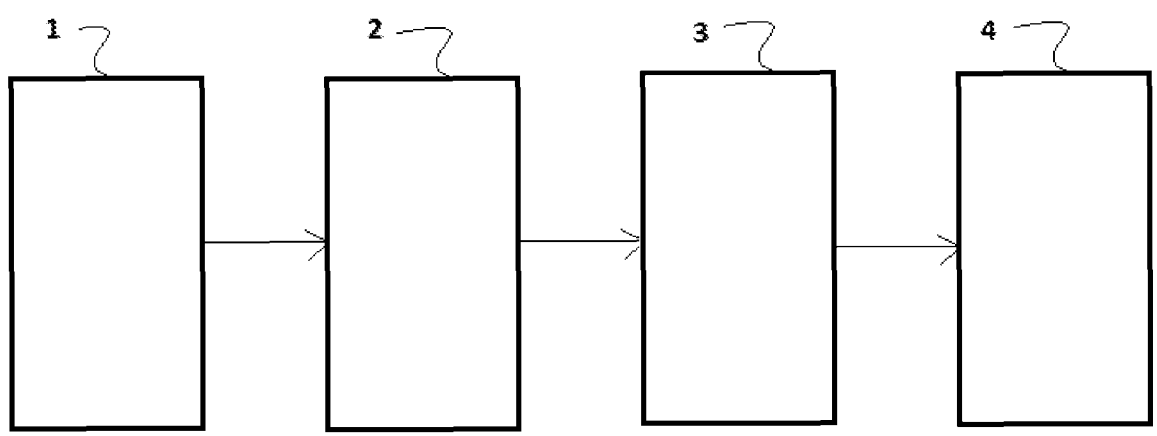
FIG. 2 depicts another reactor configuration of the prior art, namely reactors 1, 2, 3 and 4 being configured in series.

The powder can be discharged from the reactors R2 and R3 to the powder receiver vessel and from the powder receiver vessel to downstream processing as disclosed, for instance, in WO-A-00/29452, especially the embodiment of FIG. 2 therein and described on page 10, lines 7-38. Alternatively, it is possible to arrange the powder withdrawal according to EP-A-2330135, especially the embodiment described in paragraphs [0063] and [0064] with the exception that the powder stream withdrawn from the powder discharge vessel is not transferred to another gas phase reactor but to the powder bin or powder mixer, From the powder bin or the powder mixer the powder may be withdrawn, mixed with additives and extruded to pellets in an extruder. The extruder may be a single-screw extruder or, preferably, a twin screw extruder, such as a co-rotating twin screw extruder. The polymer melt may be discharged from the extruder through a die plate to a water bath. The molten strands may be cut to pellets by knives adjacent to the die plate and the pellets may be solidified in the water bath.

The pellets may then be dried and passed to a pellet mixer or a pellet bin where the pellets may be stored before shipping to customers and optionally mixed.

Preferably the reactor configuration according to the present invention is a four reactor configuration R1A-R1 and R2|R3 meaning R1A is configured in series and upstream of reactor R1 further to the reactor configuration R1, R2 and R3 as described above.

Preferably in the reactor configuration for the production of propylene copolymers according to the present invention R1, R2 and R3 are gas phase polymerization reactors. Preferably and independently thereof in the reactor configuration for the production of propylene (co)polymers according to the present invention reactor R1A is a loop reactor. More preferably according to the present invention R1A is a loop reactor and R1, R2 and R3 are gas phase polymerization reactors.

In a further aspect the present invention is concerned with a process for the polymerization of propylene copolymers in a reactor configuration as described above, i.e. in the simplest configuration including at least three reactors R1, R2 and R3, all reactors having inlet and outlet, whereby reactors R2 and R3 are configured in parallel both downstream of reactor R1; and whereby reactor R1 is configured in series and upstream of reactors R2 and R3; and whereby the outlet of reactor R1 is coupled with the inlets of both reactors R2 and R3 with the process comprising (a) polymerizing propylene and optionally at least one ethylene and/or C4 to C12 α-olefin in reactor R1 thereby obtaining a polypropylene fraction (PP2), (b) withdrawing polypropylene fraction (PP2) from reactor R1

(d) splitting said withdrawn polypropylene fraction (PP2) into two streams (S1) and (S2) and transferring stream (S1) into reactor R2 and stream (S2) into reactor R3

(d) polymerizing propylene and optionally at least one ethylene and/or C4 to C12 α-olefin in reactor R2 obtaining a polypropylene fraction (PP3), and independently therefrom polymerizing propylene and optionally at least one ethylene and/or C4 to C12 α-olefin in reactor R3 obtaining a polypropylene fraction (PP4)

(e) combining polypropylene fraction (PP3) and polypropylene fraction (PP4) to yield the final propylene (co) polymer.

Thus, theoretically the process could be used for the preparation of a homopolymer. However, the full benefits of the invention will be obtained when producing propylene copolymers and particularly heterophasic propylene copolymers.

Preferably the process according to the present invention is using four reactors. The process according to the present invention insofar uses a reactor configuration including at least four reactors R1A, R1, R2 and R3, all reactors having inlet and outlet, whereby reactor R1 is configured in series and downstream of reactor R1A, and whereby reactors R2 and R3 are configured in parallel both downstream of reactor R1; and whereby the outlet of reactor R1 is coupled with the inlets of both reactors R2 and R3; and whereby reactor R1 is configured in series and upstream of reactors R2 and R3, the process comprising (a) polymerizing propylene and optionally at least one ethylene and/or C4 to C12 α-olefin in reactor R1A obtaining a polypropylene fraction (PP1), transferring polypropylene fraction (PP1) to reactor R1

(b) further polymerizing polypropylene fraction (PP1) by feeding propylene and optionally at least one ethylene and/or C4 to C12 α-olefin in reactor R1 thereby obtaining a polypropylene fraction (PP2), (c) withdrawing polypropylene fraction (PP2) from reactor R1

(d) splitting said withdrawn polypropylene fraction (PP2) into two streams (S1) and (S2) and transferring stream (S1) into reactor R2 and stream (S2) into reactor R3;

(e) further polymerizing in reactor R2 by feeding propylene and optionally at least one ethylene and/or C4 to C12 α-olefin obtaining a polypropylene fraction (PP3), and independently therefrom polymerizing propylene and optionally at least one ethylene and/or C4 to C12 α-olefin in reactor R3 obtaining a polypropylene fraction (PP4)

(f) combining polypropylene fraction (PP3) and polypropylene fraction (PP4) to yield the final propylene (co) polymer.

All preferred embodiments and aspects as described above with respect to the reactor configuration(s) shall also hold for the process/processes as described herein.

The processes according to the present invention particularly have the advantage of allowing higher throughput when compared to a traditional completely sequential reactor configuration. For example when producing a heterophasic propylene copolymer and polymerizing the matrix component in a loop-gas phase reactor series, the capacity of the third gas phase reactor cannot be used even though loop and first gas phase reactor are running with maximum cooling capacity. In other words, higher splits, i.e. higher relative amounts of material produced in the final reactor can be achieved by the present invention. Further the option of freely choosing the splitting into streams S1 and S2 allows further possibilities. For example strongly different comonomer amount can be easily made. It is further self explaining the reactor setup may allow, depending on the products made, simplification of the equipment, for example making degassers superfluous.

The processes according to the present invention allow a surprisingly broad split of streams (S1) and (S2). Preferably the weight ratio of streams (S1):(S2) is from 10:90 to 90:10, more preferably the weight ratio of streams (S1):(S2) is from 15:85 to 85:15. Such broad variation allows extreme flexibility in term of production and also product.

In a further aspect according to the present invention the process includes a pre-polymerization step. In such prepolymerization step, the amount of material made will be less than 2 wt.-%.

Preferably the process according to the present invention includes prepolymerization and feeding of the catalyst to the per-polymerization step.

In a first embodiment, catalyst is preferably only dosed at a single step, more preferably in the prepolymerization.

In a second embodiment, catalyst is dosed only to the prepolymerization and further to the withdrawn polypropylene fraction (PP2) before splitting this fraction into the streams S1 and S2. Such integrated polymerization, i.e. not feeding catalyst separately to any of the reactors R2 and R3 guarantees best in-situ mixing.

The present invention is particularly advantageous for producing heterophasic polypropylene copolymers having a matrix phase and dispersed therein an elastomer phase.

In a first preferred embodiment the component forming essentially the matrix phase is polymerized in reactors R1A, R1 and R2, and the component forming the elastomer phase is polymerized in reactor R3. This allows varying inter alia the comonomer content and/or comonomer type and/or molecular weight in reactors R1A, R1 and R2 forming an intimate mixture and still having enough elastomer present.

In a second preferred embodiment the component forming essentially the matrix phase is polymerized in reactor R1A and the component forming the elastomer phase is polymerized in reactors R1, R2, and R3. This allows varying inter alia the comonomer content and/or comonomer type and/or molecular weight in reactors R1, R2, and R3 forming an intimate mixture. This embodiment widens the options for the nature of elastomer phase.

In a third preferred embodiment the component forming essentially the matrix phase is polymerized in reactors R1A and R1 and the component forming the elastomer phase is polymerized in reactors R2 and R3. Again the advantages as described before apply.

In yet a further aspect the present invention is concerned with the use of a reactor configuration as described herein for increase of throughput and/or productivity versus a sequential reactor setup R1-R2-R3 or R1A-R1-R2-R3.

FIG. 3 depicts a reactor configuration for the production of propylene copolymers comprising at least three reactors R1 (1), R2 (2) and R3 (3) with all reactors having inlet and outlet. As can be seen reactors R2 (2) and R3 (3) are configured in parallel both downstream of reactor R1 (1). Further reactor R1 (1) is configured in series and upstream of reactors R2 (2) and R3 (3). The outlet of reactor R1 (1) is insofar coupled with the inlets of both reactors R2 (2) and R3 (3). The reaction product originating from reactor R1 (1) is split into two streams, a first stream being sent to R2 (2) and a second stream being sent to R3 (3). Such splitting of the outlet stream as originating from R1 (1) is usually done by a control valve (not shown in FIG. 3). The polymerization products as obtained from R2 (2) and R3 (3) are combined to form the final product.

FIG. 4 depicts a further and particularly preferred embodiment according to the present invention. In addition to the embodiment shown in FIG. 3 and described above this embodiment contains a further reactor R1A (1A) being configured in series and upstream of reactor R1 (1).

Experimental Part

Two polypropylenes copolymers were produced in two reactor configurations. Reactor configuration 1 (comparative) was a loop-gas phase-gas phase-gas phase reactor configuration with four reactors all being coupled in series.

Reactor configuration 2 (inventive) was a loop-gas phase-gas phase-gas phase reactor configuration whereby reactors R2 and R3 were configured in parallel and downstream of reactor R1 as described herein.

The results are shown in the Table provided below.

TABLE

| | Reactor Configuration | parameters | |
|---|---|---|---|
| Comparative Example | Loop ↓ GPR1 ↓ GPR2 ↓ GPR3 | Total production rate, t/h | 41.4 |
| | | Production rate in loop, t/h | 17.9 |
| | | Production rate in GPR1, t/h | 12.5 |
| | | Production rate in GPR2, t/h | 3.5 |
| | | Production rate in GPR3, t/h | 7.5 |
| Example | Loop ↓ GPR1 ↙ ↘ GPR2    GPR3 | Total production rate, t/h | 45.4 |
| | | Production rate in loop, t/h | 17.9 |
| | | Production rate in GPR1, t/h | 17.9 |
| | | Production rate in GPR2, t/h | 7.5 |
| | | Production rate in GPR3, t/h | 7.5 |

The comparative example showed restrictions as to the production rate of gas phase reactor GPR2, i.e. the third reactor. The total production rate insofar was limited to a total of 41.4 t/h.

Using the inventive reactor configuration the production rate in gas phase reactor GPR2 could be significantly increased up to 7.5 t/h yielding a significantly higher total production rate of 45.4 t/h.

The invention claimed is:
1. Reactor configuration for the production of propylene copolymers comprising at least three reactors R1, R2 and R3, all reactors having inlet and outlet, whereby reactors R2 and R3 are configured in parallel both downstream of reactor R1; and whereby reactor R1 is configured in series and upstream of reactors R2 and R3, and whereby the outlet of reactor R1 is coupled with the inlets of both reactors R2 and R3, and whereby R1, R2, and R3 are gas phase polymerization reactors.

2. Reactor configuration for the production of propylene copolymers according to claim 1 further comprising reactor R1 A, whereby reactor R1 A is configured in series and upstream of reactor R1.

3. Reactor configuration for the production of propylene copolymers according to claim 2, whereby R1 A is a loop reactor.

4. Process for the polymerization of propylene (co)polymers in a reactor configuration including at least three reactors R1, R2 and R3, all reactors having inlet and outlet, whereby reactors R2 and R3 are configured in parallel both downstream of reactor R1;

whereby reactor R1 is configured in series and upstream of reactors R2 and R3;

whereby the outlet of reactor R1 is coupled with the inlets of both reactors R2 and R3, and whereby R1, R2, and R3 are gas phase polymerization reactors, the process comprising (b) polymerizing propylene and optionally at least one ethylene and/or C4 to C12 a α-olefin in reactor R1 thereby obtaining a polypropylene fraction (PP2), (c) withdrawing polypropylene fraction (PP2) from reactor R1, (d) splitting said withdrawn polypropylene fraction (PP2) into two streams (S1) and (S2) and transferring stream (S1) into reactor R2 and stream (S2) into reactor R3, (e) polymerizing propylene and optionally at least one ethylene and/or C4 to C12 a α-olefin in reactor R2 obtaining a polypropylene fraction (PP3), and independently therefrom polymerizing propylene and optionally at least one ethylene and/or C4 to C12 α-olefin in reactor R3 obtaining a polypropylene fraction (PP4), and (f) combining polypropylene fraction (PP3) and polypropylene fraction (PP4) to yield the final propylene (co)polymer.

5. Process for the polymerization of propylene (co)polymers in a reactor configuration including at least four reactors R1 A, R1, R2 and R3, all reactors having inlet and outlet, whereby reactor R1 is configured in series and downstream of reactor R1 A, and whereby reactors R2 and R3 are configured in parallel both downstream of reactor R1; and whereby the outlet of reactor R1 is coupled with the inlets of both reactors R2 and R3; and whereby reactor R1 is configured in series and upstream of reactors R2 and R3, and whereby R1, R2, and R3, are gas phase polymerization reactors, the process comprising (a) polymerizing propylene and optionally at least one ethylene and/or C4 to C12 α-olefin in reactor R1 A obtaining a polypropylene fraction (PP 1), transferring polypropylene fraction (PP1) to reactor R1, (b) further polymerizing polypropylene fraction (PP 1) by feeding propylene and optionally at least one ethylene and/or C4 to C12 α-olefin in reactor R1 thereby obtaining a polypropylene fraction (PP2), (c) withdrawing polypropylene fraction (PP2) from reactor R1, (d) splitting said withdrawn polypropylene fraction (PP2) into two streams (S1) and (S2) and transferring stream (S1) into reactor R2 and stream (S2) into reactor R3;

(e) further polymerizing in reactor R2 by feeding propylene and optionally at least one ethylene and/or C4 to C12 a α-olefin obtaining a polypropylene fraction (PP3), and independently therefrom polymerizing propylene and optionally at least one ethylene and/or C4 to C12 a α-olefin in reactor R3 obtaining a polypropylene fraction (PP4), and (f) combining polypropylene fraction (PP3) and polypropylene fraction (PP4) to yield the final propylene (co)polymer.

6. Process according to claim 4, whereby the weight ratio of the streams (S1):(S2) is from 10:90 to 90:10.

7. Process according to claim 4, including a pre-polymerization step.

8. Process according to claim 7, whereby catalyst is fed to the per-polymerization step.

9. Process according to claim 4, whereby additional catalyst is fed to the withdrawn polypropylene fraction (PP2).

10. Process according to claim 4, whereby catalyst is fed only to the pre-polymerization step and to the withdrawn polypropylene fraction (PP2).

11. Process according to claim 4, whereby a heterophasic polypropylene copolymer having a matrix phase and dispersed therein an elastomer phase is made.

12. Process according to claim 11, wherein the component forming essentially the matrix phase is polymerized in reactors R1 A, R1 and R2, and the component forming essentially the elastomer phase is polymerized in reactor R3.

13. Process according to claim 11, wherein component forming essentially the matrix phase is polymerized in reactor R1 A and the component forming essentially the elastomer phase is polymerized in reactors R1, R2, and R3.

14. Process according to claim 11, wherein component forming essentially the matrix phase is polymerized in reactors R1 A and R1 and the component forming essentially the elastomer phase is polymerized in reactors R2 and R3.

15. A method of using a reactor configuration according to claim 1 for increase of throughput and/or productivity versus a sequential reactor setup R1-R2-R3 or versus a sequential reactor setup R1 A-R1-R2-R3, comprising:

(b) polymerizing propylene and optionally at least one ethylene and/or C4 to C12 α-olefin in reactor R1 thereby obtaining a polypropylene fraction (PP2), (c) withdrawing polypropylene fraction (PP2) from reactor R1, (d) splitting said withdrawn polypropylene fraction (PP2) into two streams (S1) and (S2) and transferring stream (S1) into reactor R2 and stream (S2) into reactor R3, (e) polymerizing propylene and optionally at least one ethylene and/or C4 to C12 α-olefin in reactor R2 obtaining a polypropylene fraction (PP3), and independently therefrom polymerizing propylene and optionally at least one ethylene and/or C4 to C12 α-olefin in reactor R3 obtaining a polypropylene fraction (PP4), and (f) combining polypropylene fraction (PP3) and polypropylene fraction (PP4) to yield the final propylene (co)polymer.

* * * * *